(12) United States Patent
Sakurai et al.

(10) Patent No.: US 10,742,023 B2
(45) Date of Patent: Aug. 11, 2020

(54) AIR CONDITIONER

(71) Applicant: Mitsubishi Electric Corporation, Tokyo (JP)

(72) Inventors: Kenta Sakurai, Tokyo (JP); Hiroaki Suzuki, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 321 days.

(21) Appl. No.: 15/765,130

(22) PCT Filed: Jan. 6, 2016

(86) PCT No.: PCT/JP2016/050261
§ 371 (c)(1),
(2) Date: Mar. 30, 2018

(87) PCT Pub. No.: WO2017/119084
PCT Pub. Date: Jul. 13, 2017

(65) Prior Publication Data
US 2018/0278049 A1    Sep. 27, 2018

(51) Int. Cl.
*H02H 9/00* (2006.01)
*F24F 11/62* (2018.01)
(Continued)

(52) U.S. Cl.
CPC ........... *H02H 9/001* (2013.01); *F24F 1/0003* (2013.01); *F24F 11/30* (2018.01); *F24F 11/62* (2018.01);
(Continued)

(58) Field of Classification Search
CPC ....... H02H 9/001; H02H 1/0007; F24F 11/30; F24F 1/0003; F24F 11/62; F24F 11/88; F24F 2221/52; F24F 11/46
(Continued)

(56) References Cited

U.S. PATENT DOCUMENTS

2016/0344184 A1\* 11/2016 Sundara Moorthy .. H05B 45/50

FOREIGN PATENT DOCUMENTS

EP    2241831 A1    10/2010
EP    2481998 A1    8/2012
(Continued)

OTHER PUBLICATIONS

EP-2241831—Drawing and specification and claims (Year: 2010).\*
(Continued)

*Primary Examiner* — Dharti H Patel
(74) *Attorney, Agent, or Firm* — Posz Law Group, PLC

(57) ABSTRACT

An object is to provide an air conditioner that can prevent malfunctions due to an inrush current, where the air conditioner includes an inrush-current prevention resistor that prevents inflow of an inrush current from an AC power supply, a relay-a operation unit as a first relay that is serially connected to the inrush-current prevention resistor, a relay-b operation unit as a second relay that is connected in parallel to the inrush-current prevention resistor and the relay-a operation unit as the first relay, an indoor control unit that controls ON and OFF of the relay-a operation unit as the first relay, and an outdoor control unit that controls ON and OFF of the relay-b operation unit as the second relay. When power is being supplied from the AC power supply via the relay-a operation unit as the first relay, the outdoor control unit turns ON the relay-b operation unit as the second relay.

2 Claims, 6 Drawing Sheets

(51) Int. Cl.
*F24F 1/0003* (2019.01)
*F24F 11/30* (2018.01)
*F24F 11/88* (2018.01)
*H02H 1/00* (2006.01)
*F24F 11/46* (2018.01)

(52) U.S. Cl.
CPC .......... *F24F 11/88* (2018.01); *H02H 1/0007* (2013.01); *F24F 11/46* (2018.01); *F24F 2221/52* (2013.01)

(58) Field of Classification Search
USPC ........................................... 361/93.1
See application file for complete search history.

(56) References Cited

FOREIGN PATENT DOCUMENTS

| JP | 07-308020 A | 11/1995 |
|---|---|---|
| JP | 2010-038484 A | 2/2010 |
| JP | 2010-243051 A | 10/2010 |
| JP | 2011-069538 A | 4/2011 |
| JP | 2012-117704 A | 6/2012 |
| JP | 2012-202620 A | 10/2012 |
| JP | 2014-156963 A | 8/2014 |

OTHER PUBLICATIONS

JP-2012-117704—Drawing and specification and claims (Year: 2012).*

JP-2010-101522—Drawing and specification and claims (Year: 2010).*

JP-2014-155963—Drawing and specification and claims (Year: 2014).*

International Search Report of the International Searching Authority dated Mar. 29, 2016 for the corresponding International application No. PCT/JP2016/050261 (and English translation).

Extended European Search Report dated Aug. 14, 2017 issued in corresponding EP patent application No. 16805262.9.

* cited by examiner

US 10,742,023 B2

AIR CONDITIONER

CROSS REFERENCE TO RELATED APPLICATION

This application is a U.S. national stage application of International Patent Application No. PCT/JP2016/050261 filed on Jan. 6, 2016, the disclosure of which is incorporated herein by reference.

TECHNICAL FIELD

The present invention relates to an air conditioner including an indoor device and an outdoor device.

BACKGROUND

In a conventional air conditioner, in order to reduce standby power at the time of operation standby, a relay is provided to eliminate electric conduction at the time of operation standby. By turning OFF this relay, power supplied from an alternating-current (AC) power supply is shutdown to suppress power consumption at the time of operation standby.

As an example of such technique, Patent Literature 1 discloses an air conditioner with an object of "providing an air conditioner capable of reducing standby power", where "an indoor unit 2 comprises an outdoor activation relay 22 for opening and closing connection between a power line 8 and a signal line 16, and an indoor control part 5 for operating the outdoor activation relay 22 and supplying utility power 7 between the signal line 16 and a power signal common line 9. The indoor control part 5 opens connection between the power line 8 and the power signal common line 9 in a standby state".

PATENT LITERATURE

Patent Literature 1: Japanese Patent Application Laid-open No. 2010-243051

However, according to the above-described conventional technique, when an outside wind occurs, a bus voltage is generated due to a back electromotive force, and when a control part on the side of an outdoor unit is turned ON with the bus voltage, there is a possibility that an outdoor relay is turned ON without turning ON an inrush-current prevention relay. Therefore, even though an inrush-current prevention resistor is provided, there is a problem that inflow of an inrush current cannot be prevented and malfunctions may happen.

SUMMARY

The present invention has been achieved in view of the above problems, and an object of the present invention is to provide an air conditioner that can prevent malfunctions due to an inrush current.

To solve the above described problem and achieve the object, an air conditioner according to the present invention includes: an inrush-current prevention resistor that prevents inflow of an inrush current coming from an AC power supply; a first relay serially connected to the inrush-current prevention resistor; a second relay connected in parallel to the inrush-current prevention resistor and the first relay; an indoor control unit that controls ON and OFF of the first relay; and an outdoor control unit that controls ON and OFF of the second relay. When power is being supplied from the AC power supply via the first relay, the outdoor control unit turns ON the second relay.

The air conditioner according to the present invention can prevent malfunctions due to an inrush current.

DETAILED DESCRIPTION

Exemplary embodiments of an air conditioner according to the present invention will be explained below in detail with reference to the accompanying drawings. The present invention is not limited to the embodiments.

First Embodiment

Figure 1:
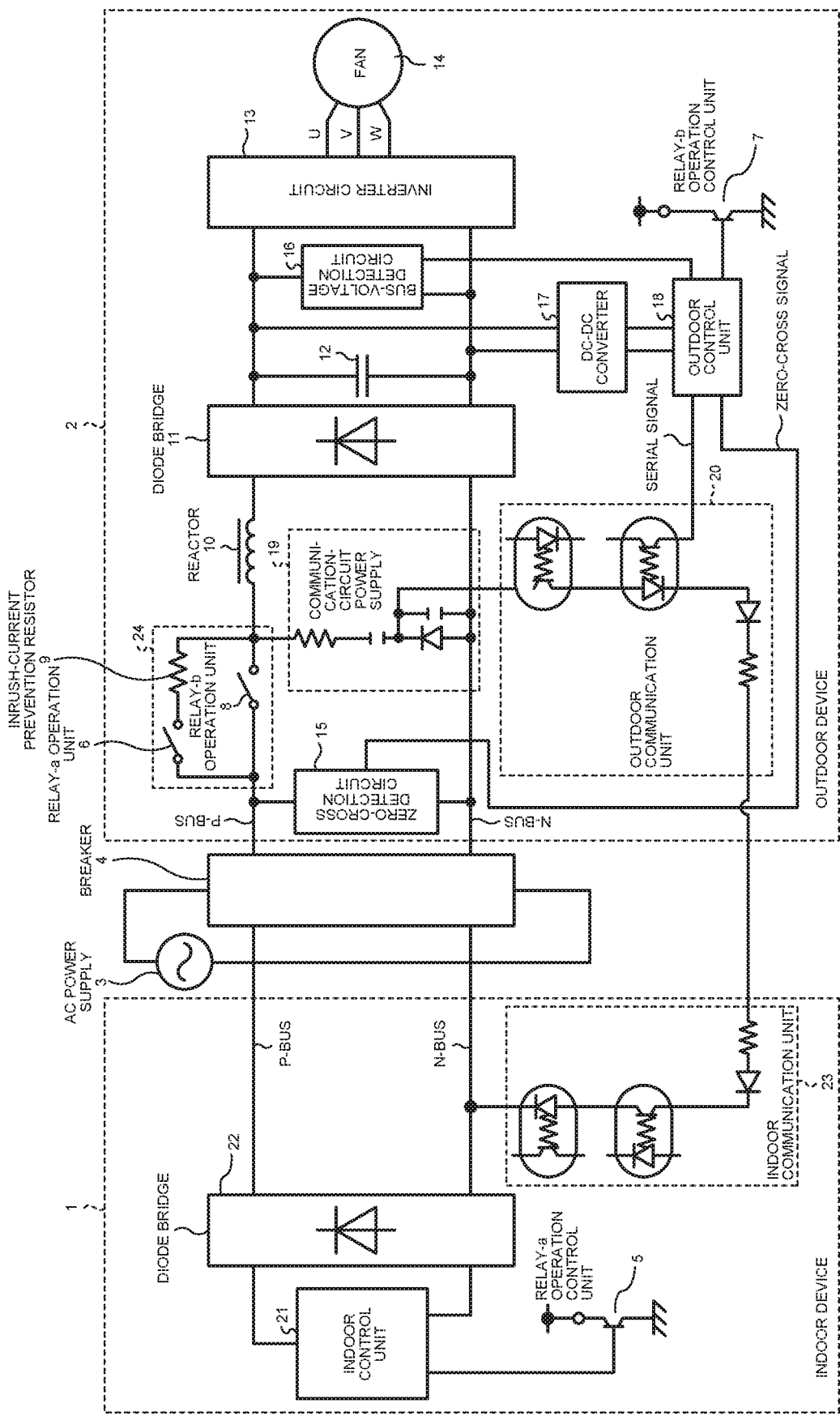
FIG. 1 is a diagram illustrating an example of a configuration of an electric component system of an air conditioner according to a first embodiment.

FIG. 1 is a diagram illustrating an example of a configuration of an electric component system of an air conditioner according to a first embodiment of the present invention. The air conditioner illustrated in FIG. 1 includes an indoor device 1 and an outdoor device 2, and a breaker 4 is provided between the indoor device 1 and the outdoor device 2. The indoor device 1 and the outdoor device 2 are connected to an AC power supply 3 via the breaker 4. When a large current exceeding a setting value flows, the breaker 4 disconnects the AC power supply 3 from the air conditioner.

The indoor device 1 includes a diode bridge 22 connected to the breaker 4, an indoor control unit 21 connected to the diode bridge 22, an indoor communication unit 23 connected to an N-bus between the AC power supply 3 and the diode bridge 22, and a relay-a operation control unit 5 connected to the indoor control unit 21. The indoor control unit 21 is formed of a microcomputer, for example.

The diode bridge 22 rectifies power supplied from the AC power supply 3. Upon supply of power from the diode bridge 22, the indoor control unit 21 controls operations of the indoor device 1 and outputs a relay-a command signal to the relay-a operation control unit 5. The indoor communication unit 23 includes a resistive element, a diode, and a photocoupler, and performs communication with an outdoor communication unit 20 provided in the outdoor device 2. The relay-a operation control unit 5 controls ON and OFF of a relay-a operation unit 6 provided in the outdoor device 2 according to the relay-a command signal input from the indoor control unit 21.

The outdoor device 2 includes: a zero-cross detection circuit 15 connected to the breaker 4; a communication-circuit power supply 19 provided at a subsequent part of the zero-cross detection circuit 15; a relay unit 24 provided on a P-bus between the zero-cross detection circuit 15 and the communication-circuit power supply 19; a diode bridge 11 provided at a subsequent part of the communication-circuit power supply 19; a reactor 10 provided on a P-bus between the communication-circuit power supply 19 and the diode bridge 11; a smoothing capacitor 12 provided at a subsequent part of the diode bridge 11; a DC-DC converter 17 provided at a subsequent part of the smoothing capacitor 12; a bus-voltage detection circuit 16 provided at a subsequent part of the DC-DC converter 17; an inverter circuit 13 provided at a subsequent part of the bus-voltage detection circuit 16; a fan 14 to which an output of the inverter circuit 13 is connected; an outdoor control unit 18 to which the DC-DC converter 17 is connected; the outdoor communication unit 20 to which the outdoor control unit 18 and the communication-circuit power supply 19 are connected; and a relay-b operation control unit 7 connected to the outdoor control unit 18. Further, the relay unit 24 includes: the relay-a operation unit 6 as a first relay whose ON and OFF is controlled by the relay-a operation control unit 5; a relay-b operation unit 8 as a second relay whose ON and OFF is controlled by the relay-b operation control unit 7; and an inrush-current prevention resistor 9 that is serially connected to the relay-a operation unit 6.

Upon detection of a fact that an input signal has crossed a zero level, the zero-cross detection circuit 15 outputs a zero-cross signal at this timing. The zero-cross signal is a signal that is generated at the time of detecting zero-crossing, and it is, for example, a pulse signal that is generated and outputted when zero-crossing is detected. The communication-circuit power supply 19 supplies power to the outdoor communication unit 20. The diode bridge 11 rectifies power of a subsequent part of the communication-circuit power supply 19. The reactor 10 is a direct-current reactor. The smoothing capacitor 12 smoothes a voltage of a subsequent part of the diode bridge 11. The DC-DC converter 17 converts a voltage having been smoothed by the smoothing capacitor 12 and outputs the voltage to the outdoor control unit 18. The bus-voltage detection circuit 16 detects a bus voltage at a subsequent part of the DC-DC converter 17 and outputs a bus-voltage detection value. The inverter circuit 13 converts a direct current into a three-phase alternating current. The fan 14 is operated when a motor (not illustrated) is driven with, as an input, a three-phase alternating current that is an output of the inverter circuit 13. The outdoor control unit 18: is operated by a voltage having been converted by the DC-DC converter 17; a zero-cross signal is inputted from the zero-cross detection circuit 15; conducts a serial signal input and output between the outdoor communication unit 20; has input a bus-voltage detection value from the bus-voltage detection circuit 16; and outputs a relay-b command signal to the relay-b operation control unit 7. The outdoor control unit 18 is formed of a microcomputer, for example. The outdoor communication unit 20 is operated by power supplied from the communication-circuit power supply 19, conducts a serial signal input and output between the outdoor control unit 18, and communicates with the indoor communication unit 23 of the indoor device 1.

An activating operation of the air conditioner illustrated in FIG. 1 will be described below. First, when supply of power from the AC power supply 3 is started, this power is supplied to the indoor device 1 via the breaker 4. However, because both the relay-a operation unit 6 and the relay-b operation unit 8 are turned OFF, the power is not supplied to the outdoor device 2. Therefore, the indoor control unit 21 of the indoor device 1 outputs a relay-a command signal to the relay-a operation control unit 5 and turns ON the relay-a operation unit 6. When the relay-a operation unit 6 is turned ON, a current flows via the inrush-current prevention resistor 9 to the reactor 10, the diode bridge 11, and the smoothing capacitor 12 to generate a bus voltage. When the bus voltage is generated, the DC-DC converter 17 outputs a converted voltage to the outdoor control unit 18, and an operation of the outdoor control unit 18 is started. The outdoor control unit 18 having its operation started outputs a relay-b command signal to the relay-b operation control unit 7 to turn ON the relay-b operation unit 8. Power is supplied in this manner to the inverter circuit 13 and the fan 14 is operated.

However, when an outside wind occurs around the outdoor device 2, a back electromotive force is generated by rotation of the fan 14 caused by the outside wind, and a bus voltage is generated due to this back electromotive force. With the bus voltage generated in this manner, the DC-DC converter 17 outputs a converted voltage to the outdoor control unit 18 and an operation of the outdoor control unit 18 is started. The outdoor control unit 18 having its operation started outputs a relay-b command signal to the relay-b operation control unit 7 to turn ON the relay-b operation unit 8. When the operation is started in this manner, because the relay-b operation unit 8 is turned ON without turning ON the relay-a operation unit 6 that is serially connected to the inrush-current prevention resistor 9, inflow of an inrush current cannot be suppressed, and thus a large current is generated, the breaker 4 is operated by the large current, and a normal activating operation of the air conditioner cannot be performed.

Figure 2:
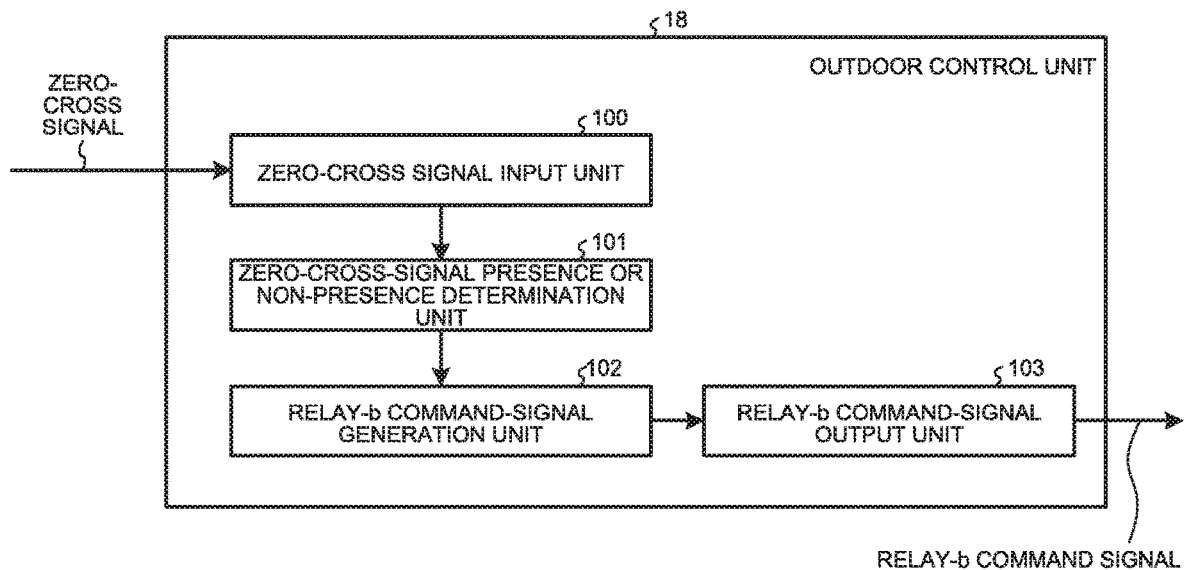
FIG. 2 is a diagram illustrating an example of a configuration of an outdoor control unit of the air conditioner according to the first embodiment.

FIG. 2 is a diagram illustrating an example of a configuration of the outdoor control unit 18 of the air conditioner according to the first embodiment. The outdoor control unit 18 illustrated in FIG. 2 includes: a zero-cross signal input unit 100 to which a zero-cross signal is input; a zero-cross-signal presence or non-presence determination unit 101 that determines the presence or non-presence of a zero-cross signal having been input in the zero-cross signal input unit 100; a relay-b command-signal generation unit 102 to which a determination result of the zero-cross-signal presence or non-presence determination unit 101 is input and generates a relay-b command signal; and a relay-b command-signal output unit 103 that outputs the relay-b command signal having been generated by the relay-b command-signal generation unit 102.

Figure 3:
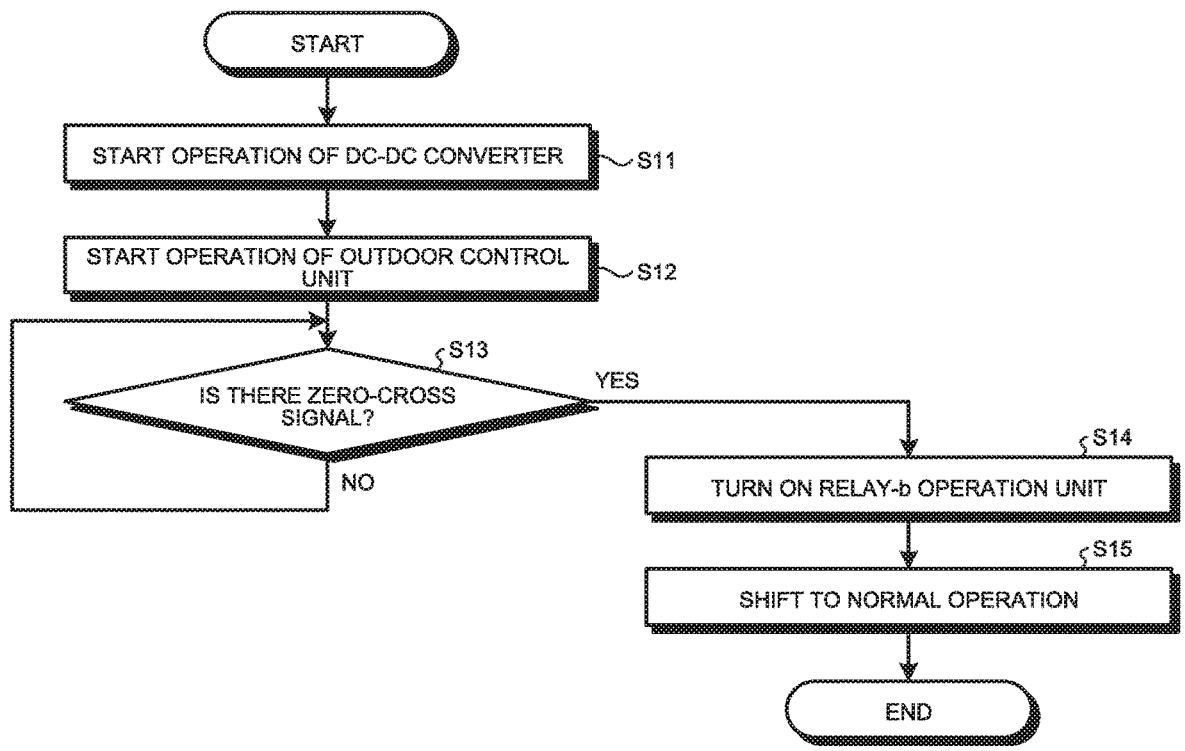
FIG. 3 is a flowchart illustrating an operation of the air conditioner according to the first embodiment.

FIG. 3 is a flowchart illustrating an operation of the air conditioner according to the first embodiment. The air conditioner illustrated in FIG. 3 is operated in the same manner as the activating operation described above until when a bus voltage is generated. In the flowchart illustrated in FIG. 3, processing is started upon generation of a bus voltage. First, upon generation of a bus voltage, an operation of the DC-DC converter 17 is started (S11), the DC-DC converter 17 having its operation started outputs a converted voltage to the outdoor control unit 18, and an operation of the outdoor control unit 18 is started (S12). The outdoor control unit 18 having its operation started determines the presence or non-presence of a zero-cross signal coming from the zero-cross detection circuit 15 (S13). When there is no zero-cross signal (NO at S13), the determination is continued without outputting a relay-b command signal to the relay-b operation control unit 7. When there is a zero-cross signal (YES at S13), a relay-b command signal is output to the relay-b operation control unit 7, the relay-b operation unit 8 is turned ON (S14), and the operation is shifted to a normal operation (S15). Power is supplied in this manner to the inverter circuit 13 and the fan 14 is operated.

When an outside wind occurs, a back electromotive force is generated by rotation of the fan 14 caused by the outside wind, a bus voltage is generated due to this back electromotive force, an operation of the DC-DC converter 17 is started (S11), and an operation of the outdoor control unit 18 is also started (S12). At this time, when the outdoor control unit 18 having its operation started determines the presence or non-presence of a zero-cross signal coming from the zero-cross detection circuit 15 (S13), because there is no zero-cross signal (NO at S13) when a bus voltage is generated due to the back electromotive force, the determination is continued without outputting a relay-b command signal to the relay-b operation control unit 7.

As described above, as the outdoor control unit 18 turns ON the relay-b operation unit 8 as the second relay when power is being supplied from the AC power supply 3 via the relay-a operation unit 6 as the first relay, it is possible to obtain an air conditioner that can suppress inflow of an inrush current caused by turning its power ON, due to a back electromotive force caused by an outside wind without undergoing a normal activating operation, and that can be activated without operating a breaker.

Second Embodiment

In the first embodiment, there has been described a mode in which whether the air conditioner is to be activated is determined depending on the presence or non-presence of a zero-cross signal; however, the present invention is not limited thereto. In the second embodiment, there is described a mode in which whether the air conditioner is to be activated is determined depending on the presence or non-presence of a serial signal that is output by the outdoor communication unit 20.

Figure 4:
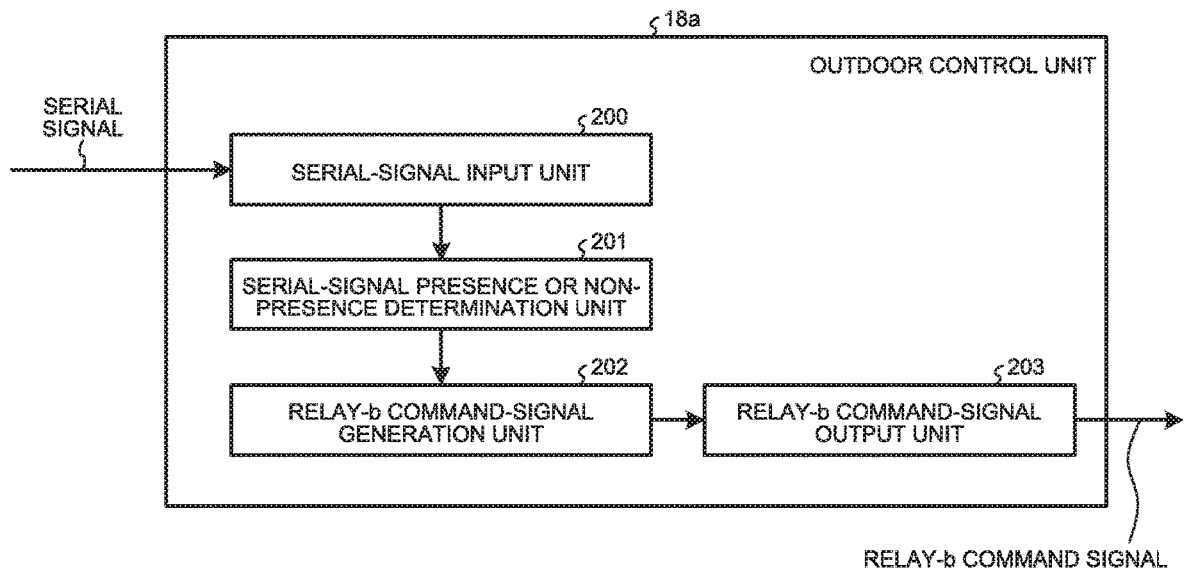
FIG. 4 is a diagram illustrating an example of a configuration of an outdoor control unit of an air conditioner according to a second embodiment.

FIG. 4 is a diagram illustrating an example of a configuration of an outdoor control unit 18a of the air conditioner according to the second embodiment. The outdoor control unit 18a illustrated in FIG. 4 includes: a serial-signal input unit 200 to which a serial signal is input; a serial-signal presence or non-presence determination unit 201 that determines the presence or non-presence of a serial signal having been input in the serial-signal input unit 200; a relay-b command-signal generation unit 202 to which a determination result of the serial-signal presence or non-presence determination unit 201 is input and generates a relay-b command signal; and a relay-b command-signal output unit 203 that outputs the relay-b command signal having been generated by the relay-b command-signal generation unit 202.

Figure 5:
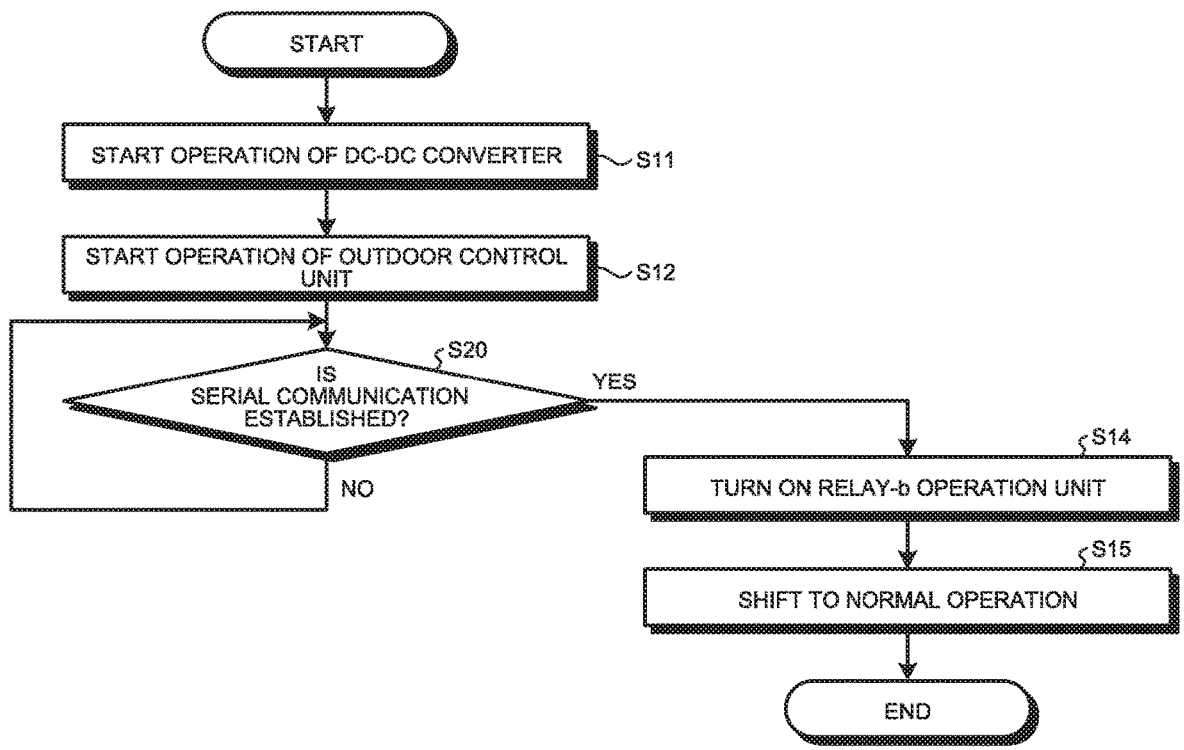
FIG. 5 is a flowchart illustrating an operation of the air conditioner according to the second embodiment.

FIG. 5 is a flowchart illustrating an operation of the air conditioner according to the second embodiment. In the flowchart illustrated in FIG. 5, processes same as the processes in the flowchart illustrated in FIG. 3 are denoted with like reference signs. Similarly to the flowchart illustrated in FIG. 3, processing is started upon generation of a bus voltage.

First, upon generation of a bus voltage, an operation of the DC-DC converter 17 is started (S11), the DC-DC converter 17 having its operation started outputs a converted voltage to the outdoor control unit 18a, and an operation of the outdoor control unit 18a is started (S12). The outdoor control unit 18a having its operation started determines the presence or non-presence of a serial signal coming from the outdoor communication unit 20. That is, the outdoor control unit 18a determines whether serial communication between the indoor device 1 and the outdoor device 2 is established (S20). When no serial communication is established (NO at S20), the determination is continued without outputting a relay-b command signal to the relay-b operation control unit 7. When serial communication is established (YES at S20), a relay-b communication signal is output to the relay-b operation control unit 7, the relay-b operation unit 8 is turned ON (S14), and the operation is shifted to a normal operation (S15). Power is supplied in this manner to the inverter circuit 13 and the fan 14 is operated.

When an outside wind occurs, a back electromotive force is generated by rotation of the fan 14 caused by the outside wind, a bus voltage is generated due to this back electromotive force, an operation of the DC-DC converter 17 is started (S11), and an operation of the outdoor control unit 18a is also started (S12). At this time, when the outdoor control unit 18a having its operation started determines whether serial communication has been established (S20), when a bus voltage is generated due to the back electromotive force, the determination is continued without outputting a relay-b command signal to the relay-b operation control unit 7 because no serial signal coming from the outdoor communication unit 20 is input and no serial communication is established (NO at S20).

As described above, because the outdoor control unit 18a turns ON the relay-b operation unit 8 as the second relay when power is being supplied from the AC power supply 3 via the relay-a operation unit 6 as the first relay, it is possible to obtain an air conditioner that can suppress inflow of an inrush current caused by turning its power ON, due to a back electromotive force caused by an outside wind without undergoing a normal activating operation, and that can be activated without operating a breaker.

Third Embodiment

In the first embodiment, there has been described a mode in which whether the air conditioner is to be activated is determined depending only on the presence or non-presence of a zero-cross signal, and in the second embodiment, there has been described a mode in which whether the air conditioner is to be activated is determined depending only on the presence or non-presence of a serial signal; however, the present invention is not limited thereto. In the third embodiment, there is described a mode in which whether the air conditioner is to be activated is determined depending on the presence or non-presence of both a zero-cross signal and a serial signal.

Figure 6:
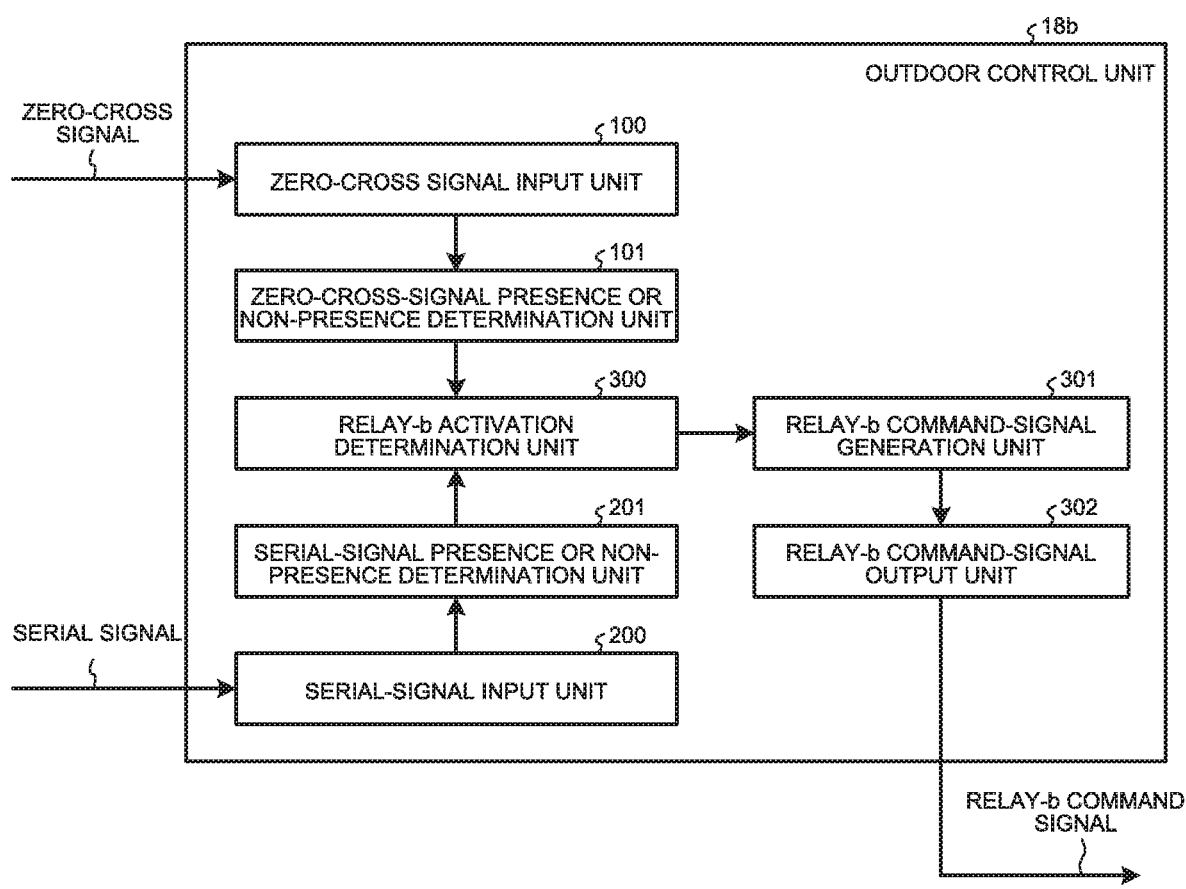
FIG. 6 is a diagram illustrating an example of a configuration of an outdoor control unit of an air conditioner according to a third embodiment.

FIG. 6 is a diagram illustrating an example of a configuration of an outdoor control unit 18b of the air conditioner according to the third embodiment. The outdoor control unit 18b illustrated in FIG. 6 includes: the zero-cross signal input unit 100 to which a zero-cross signal is input, the zero-cross-signal presence or non-presence determination unit 101 that determines the presence or non-presence of a zero-cross signal having been input in the zero-cross signal input unit 100; the serial-signal input unit 200 to which a serial signal is input; the serial-signal presence or non-presence determination unit 201 that determines the presence or non-presence of a serial signal having been input in the serial-signal input unit 200; a relay-b activation determination unit 300, to which a determination result of the zero-cross-signal presence or non-presence determination unit 101 and a determination result of the serial-signal presence or non-presence determination unit 201 are input, and determines whether the relay-b operation unit 8 is to be turned ON; a relay-b command-signal generation unit 301 to which a determination result of the relay-b activation determination unit 300 is input and generates a relay-b command signal; and a relay-b command-signal output unit 302 that outputs a relay-b command signal having been generated by the relay-b command-signal generation unit 301. In FIG. 6, constituent elements identical to those of FIGS. 2 and 4 are denoted with like reference signs.

Figure 7:
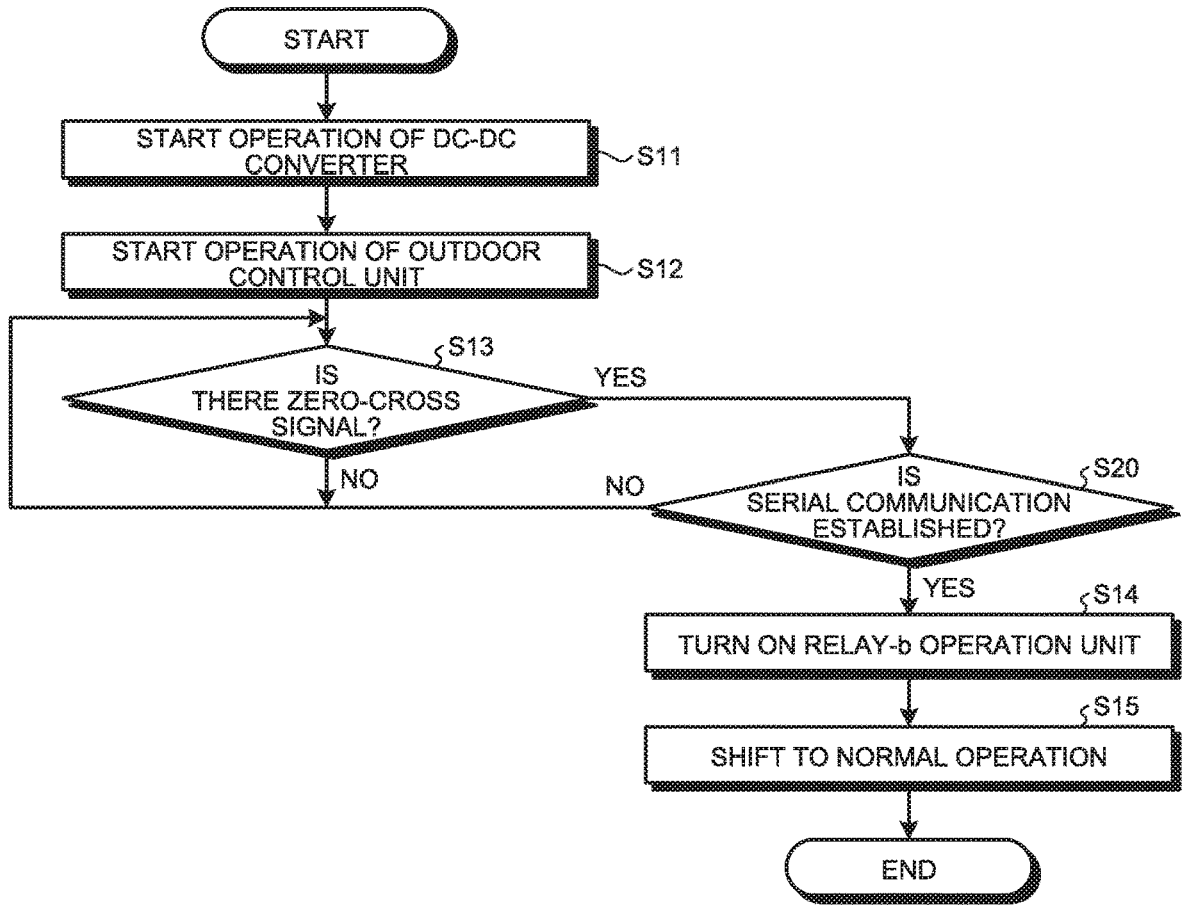
FIG. 7 is a flowchart illustrating an operation of the air conditioner according to the third embodiment.

FIG. 7 is a flowchart illustrating an operation of the air conditioner according to the third embodiment. In the flowchart illustrated in FIG. 7, processes same as the processes in the flowcharts illustrated in FIG. 3 and are denoted with like reference signs. Also in the flowchart illustrated in FIG. 7, similarly to the flowcharts illustrated in FIGS. 3 and 5, processing is started upon generation of a bus voltage. First, upon generation of a bus voltage, an operation of the DC-DC converter 17 is started (S11), the DC-DC converter 17 having its operation started outputs a converted voltage to the outdoor control unit 18b, and an operation of the outdoor control unit 18b is started (S12). The outdoor control unit 18b having its operation started determines the presence or non-presence of a zero-cross signal coming from the zero-cross detection circuit 15 (S13). When there is no zero-cross signal (NO at S13), the determination is continued without outputting a relay-b command signal to the relay-b operation control unit 7. When there is a zero-cross signal (YES at S13), the presence or non-presence of a serial signal coming from the outdoor communication unit 20 is determined. That is, it is determined whether serial communication between the outdoor communication unit 20 and the indoor device 1 is established (S20). When no serial communication is established (NO at S20), the process returns to S13 without outputting a relay-b command signal to the relay-b operation control unit 7, and the presence or non-presence of a zero-cross signal is determined (S13). When serial communication is established (YES at S20), the relay-b command signal is output to the relay-b operation control unit 7, the relay-b operation unit 8 is turned ON (S14), and the operation of is shifted to a normal operation (S15).

As described in the third embodiment, by determining the presence or non-presence of both a zero-cross signal and a serial signal, it is possible to obtain an air conditioner that does not cause any malfunction even when any one of the zero-cross signal and the serial signal is erroneously generated, that can suppress inflow of an inrush current caused by turning its power ON, due to a back electromotive force caused by an outside wind without undergoing a normal activating operation, and that can be activated without operating a breaker.

Each of the air conditioners described in the first to third embodiments includes: an inrush-current prevention resistor that prevents inflow of an inrush current from an AC power supply; a first relay that is serially connected to the inrush-current prevention resistor; a second relay that is connected in parallel to the inrush-current prevention resistor and the first relay; an indoor control unit that controls ON and OFF of the first relay; and an outdoor control unit that controls ON and OFF of the second relay, where the outdoor control unit turns ON a relay-b operation unit as the second relay, when power is being supplied from the AC power supply via a relay-a operation unit as the first relay. In the above embodiments, there have been described the following modes: in the first embodiment, a zero-cross signal is input in the outdoor control unit; in the second embodiment, a serial signal coming from an outdoor communication unit is input in the outdoor control unit; in the third embodiment, both a serial signal coming from the outdoor communication unit and a zero-cross signal are input in the outdoor control unit, and it is determined whether power is being supplied from the AC power supply via the relay-a operation unit as the first relay.

Fourth Embodiment

In the first to third embodiments, modes in which whether the air conditioner is to be activated is determined depending on the presence or non-presence of any one or both of a zero-cross signal and a serial signal; however, the present invention is not limited thereto. In the fourth embodiment, a mode in which whether the air conditioner is to be activated is determined depending on a bus-voltage detection value.

Figure 8:
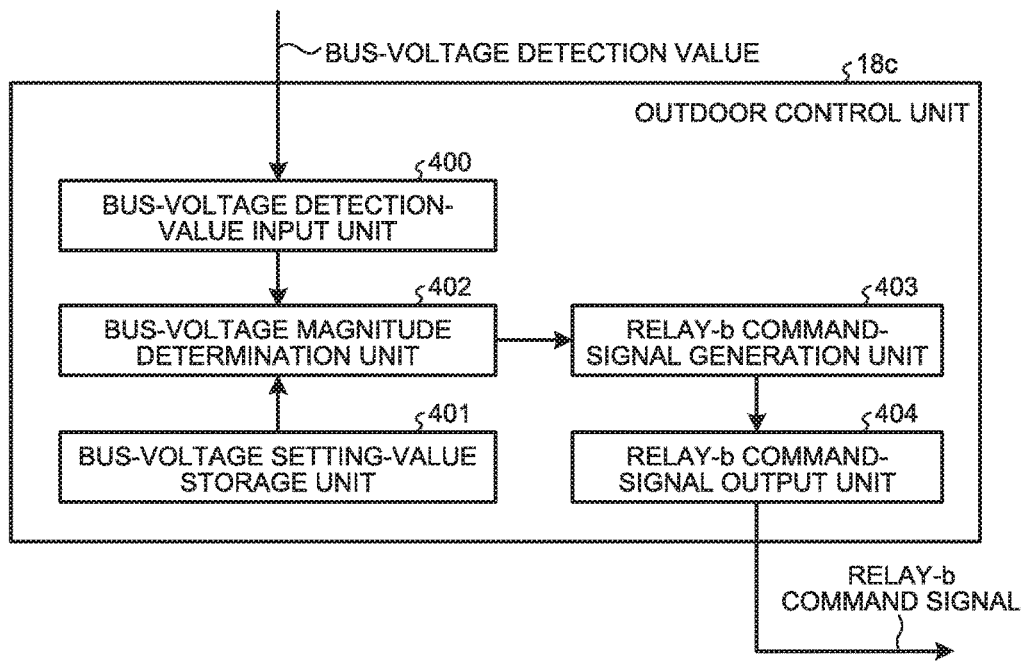
FIG. 8 is a diagram illustrating an example of a configuration of an outdoor control unit of an air conditioner according to a fourth embodiment.

FIG. 8 is a diagram illustrating an example of a configuration of an outdoor control unit 18c of the air conditioner according to the fourth embodiment. The outdoor control unit 18c illustrated in FIG. 8 includes: a bus-voltage detection-value input unit 400 to which a bus-voltage detection value is input; a bus-voltage setting-value storage unit 401 having a bus-voltage setting value stored therein; a bus-voltage magnitude determination unit 402 that determines a magnitude relation between the bus-voltage detection value input in the bus-voltage detection-value input unit 400 and the bus-voltage setting value stored in the bus-voltage setting-value storage unit 401; a relay-b command-signal generation unit 403 to which a determination result of the bus-voltage magnitude determination unit 402 is input and generates a relay-b command signal; and a relay-b command-signal output unit 404 that outputs a relay-b command signal having been generated by the relay-b command-signal generation unit 403.

Figure 9:
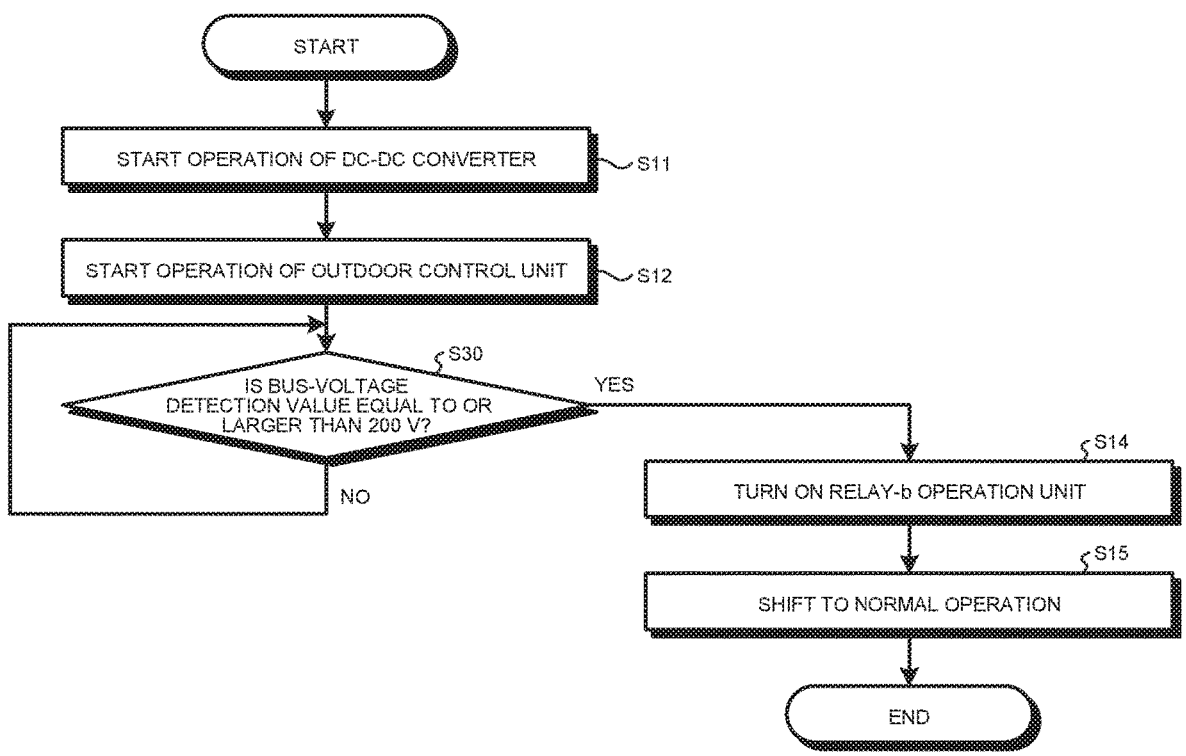
FIG. 9 is a flowchart illustrating an operation of the air conditioner according to the fourth embodiment.

FIG. 9 is a flowchart illustrating an operation of the air conditioner according to the fourth embodiment. In the flowchart illustrated in FIG. 9, processes same as the processes in the flowchart illustrated in FIG. 3 are denoted with like reference signs. Similarly to the flowchart illustrated in FIG. 3, processing is started upon generation of a bus voltage. First, upon generation of a bus voltage, an operation of the DC-DC converter 17 is started (S11), the DC-DC converter 17 having its operation started outputs a converted voltage to the outdoor control unit 18c, and an operation of the outdoor control unit 18c is started (S12). The outdoor control unit 18c having its operation started determines whether a bus-voltage detection value detected by the bus-voltage detection circuit 16 is equal to or larger than a bus-voltage setting value (S30). In this case, the bus-voltage setting value is 200 V. When the bus-voltage detection value is not equal to or larger than the bus-voltage setting value (NO at S30), the determination is continued without outputting a relay-b command signal to the relay-b operation control unit 7. When the bus-voltage detection value is equal to or larger than the bus-voltage setting value (YES at S30), a relay-b command signal is output to the relay-b operation control unit 7, the relay-b operation unit 8 is turned ON (S14), and the operation is shifted to a normal operation (S15). Power is supplied in this manner to the inverter circuit 13 and the fan 14 is operated.

When an outside wind occurs, a back electromotive force is generated by rotation of the fan 14 caused by the outside wind, a bus voltage is generated due to this back electromotive force, an operation of the DC-DC converter 17 is started (S11), and an operation of the outdoor control unit 18c is also started (S12). At this time, when the outdoor control unit 18c having its operation started determines whether the bus-voltage detection value is equal to or larger than the bus-voltage setting value (S30), if the bus voltage is not equal to or larger than the bus-voltage setting value, it is determined that a bus voltage is generated due to a back electromotive force and the relay-b operation unit 8 is not turned ON, and if the bus voltage is equal to or larger than the bus-voltage setting value, it is determined that the bus voltage is generated by the power supplied from the AC power supply 3, and in this case it is possible to normally activate the relay-b operation unit 8, and thus the relay-b operation unit 8 is turned ON and its operation is started.

By operating the constituent elements according to the fourth embodiment as described above, it is possible to obtain an air conditioner that can execute control such that the air conditioner is not activated by a back electromotive force caused by an outside wind, by determining whether generation of a bus voltage is due to the power supplied from the AC power supply 3 or it is due to a back electromotive force caused by an outside wind.

Figure 10:
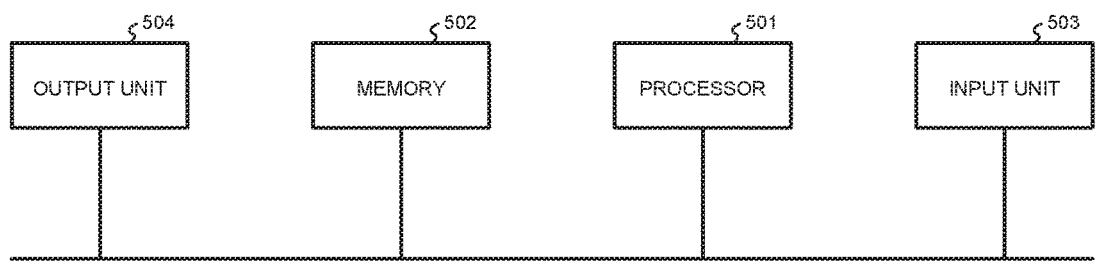
FIG. 10 is a diagram illustrating an example of a general configuration of hardware that realizes the outdoor control units according to the first to fourth embodiments.

In the first to fourth embodiments described above, each of the outdoor control units 18, 18a, 18b, and 18c includes at least a processor, a memory, an input unit, and an output unit, and operations of the respective devices can be realized by software. FIG. 10 is a diagram illustrating an example of a general configuration of software that realizes the outdoor control units according to the first to fourth embodiments. The device illustrated in FIG. 10 includes a processor 501, a memory 502, an input unit 503, and an output unit 504. The processor 501 performs calculations and executes control by software while using received data, and the memory 502 stores therein the received data or data that is necessary for the processor 501 to perform calculations and execute control and also stores therein the software. The input unit 503 corresponds to the zero-cross signal input unit 100, the serial-signal input unit 200, and the bus-voltage detection-value input unit 400. The output unit 504 corresponds to the relay-b command-signal output units 103, 203, 302, and 404. Each of the processor 501, the memory 502, the input unit 503, and the output unit 504 may be provided in plural.

The configurations described in the above embodiments are only examples of the contents of the present invention. These configurations can be combined with other publicly known techniques, and a part of the configurations can be omitted or modified without departing from the scope of the present invention.

The invention claimed is:

1. An air conditioner comprising:
an inrush-current prevention resistor to prevent inflow of an inrush current coming from an AC power supply;
a first relay serially connected to the inrush-current prevention resistor;
a second relay connected in parallel to the inrush-current prevention resistor and the first relay;
an indoor control unit to control ON and OFF of the first relay; and
an outdoor control unit to control ON and OFF of the second relay, wherein
when power is being supplied from the AC power supply via the first relay, the outdoor control unit turns ON the second relay; wherein the air conditioner further comprises:
a zero-cross detection circuit to output a zero-cross signal upon detection of a fact that an input signal coming from the AC power supply has crossed a zero level; and
an outdoor communication unit to perform inputting and outputting of a serial signal with the outdoor control unit, wherein
upon detection of the zero-cross signal, or both the zero-cross signal and the serial signal, the outdoor control unit determines that the power is being supplied from the AC power supply via the first relay.

2. The air conditioner according to claim 1, further comprising a bus-voltage detection circuit to detect a bus voltage and outputs a bus-voltage detection value, wherein
when the bus-voltage detection value is equal to or larger than a setting value, the outdoor control unit determines that power is being supplied from the AC power supply via the first relay.

\* \* \* \* \*